US009665335B2

(12) United States Patent
Eguchi et al.

(10) Patent No.: US 9,665,335 B2
(45) Date of Patent: May 30, 2017

(54) PROJECTOR, DISPLAY DEVICE, DISPLAY SYSTEM, AND CONTROL METHOD OF DISPLAY DEVICE

(71) Applicant: SEIKO EPSON CORPORATION, Tokyo (JP)

(72) Inventors: Makoto Eguchi, Sapporo (JP); Takahiro Otsu, Sapporo (JP); Mitsuhiro Yoshida, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 169 days.

(21) Appl. No.: 14/567,587

(22) Filed: Dec. 11, 2014

(65) Prior Publication Data

US 2015/0199166 A1    Jul. 16, 2015

(30) Foreign Application Priority Data

Jan. 15, 2014  (JP) ................................. 2014-005337
Mar. 19, 2014  (JP) ................................. 2014-056534

(51) Int. Cl.
*G06F 3/14* (2006.01)
*G03B 21/10* (2006.01)
(Continued)

(52) U.S. Cl.
CPC ........... *G06F 3/1454* (2013.01); *G03B 21/10* (2013.01); *G09G 5/14* (2013.01); *G03B 2206/00* (2013.01);
(Continued)

(58) Field of Classification Search
None
See application file for complete search history.

(56) References Cited

U.S. PATENT DOCUMENTS 7,551,175 B2    6/2009  Sakanishi et al.
2004/0019641 A1*  1/2004  Bartram ................ H04L 67/104
                                                709/205
(Continued)

FOREIGN PATENT DOCUMENTS

JP    A-2005-181404    7/2005
JP    A-2010-122265    6/2010
(Continued)

*Primary Examiner* — Benjamin C Lee
*Assistant Examiner* — David Lee
(74) *Attorney, Agent, or Firm* — Oliff PLC

(57) ABSTRACT

A projector includes an optical modulation section, a projection section, a driving section driving the optical modulation section, a selection section selecting at least one electronic apparatus, a storage section storing each user name of a plurality of electronic apparatuses, a reception section receiving an input by a user on a projection surface, and a projection image creation section creating a projection image. The projection image creation section reflects an image drawn on the basis of the input received by the reception section onto the projection image, creates a selection image including a user name stored in the storage section, and reflects the selection image onto the projection image. When an input for selecting a user is received, the selection section selects an electronic apparatus corresponding to the selected user on the projection surface onto which the selection image is projected.

14 Claims, 13 Drawing Sheets

(51) Int. Cl.
*G09G 5/14* (2006.01)
*H04N 9/31* (2006.01)

(52) U.S. Cl.
CPC ..... *G09G 2358/00* (2013.01); *G09G 2370/04* (2013.01); *G09G 2370/16* (2013.01); *G09G 2370/20* (2013.01)

(56) References Cited

U.S. PATENT DOCUMENTS

| | | |
|---|---|---|
| 2005/0128530 A1 | 6/2005 | Aiba et al. |
| 2011/0221763 A1 | 9/2011 | Arizumi et al. |
| 2012/0314067 A1* | 12/2012 | Kitabayashi ............. H04N 7/15 348/143 |
| 2013/0091440 A1* | 4/2013 | Kotler ................... G06Q 10/10 715/753 |
| 2013/0106908 A1* | 5/2013 | Ichieda ................ G06F 3/0425 345/629 |

FOREIGN PATENT DOCUMENTS

| | | |
|---|---|---|
| JP | A-2011-191499 | 9/2011 |
| JP | B2-5295500 | 9/2013 |

* cited by examiner

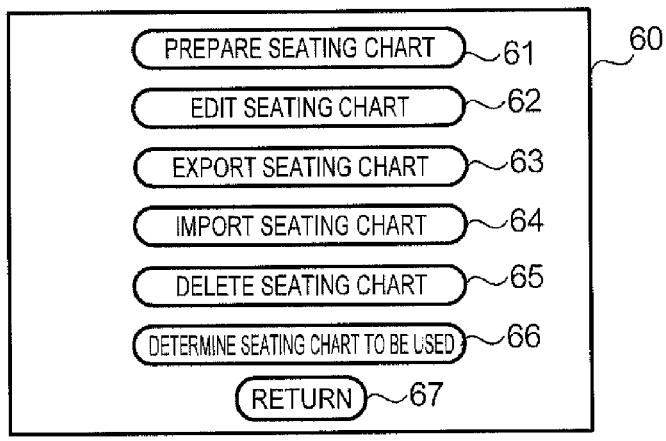
FIG. 13
FIG. 14A
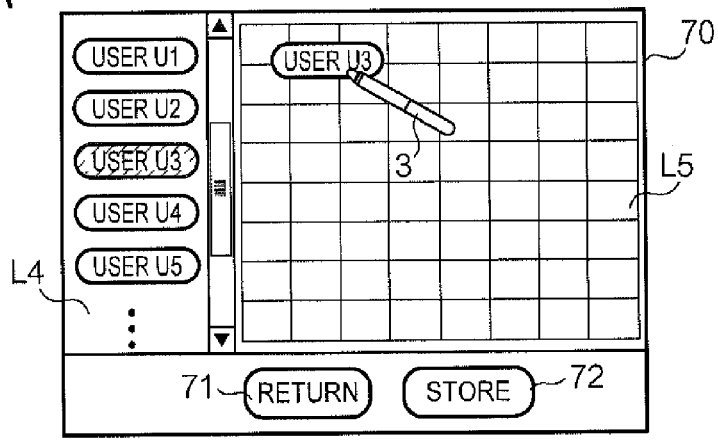
FIG. 14B
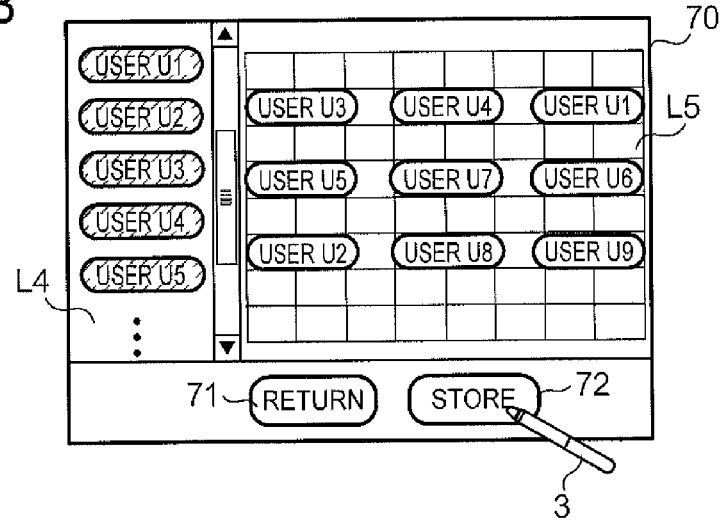

PROJECTOR, DISPLAY DEVICE, DISPLAY SYSTEM, AND CONTROL METHOD OF DISPLAY DEVICE

CROSS-REFERENCE TO RELATED APPLICATION

The entire disclosure of Japanese Patent Application No. 2014-005337, filed Jan. 15, 2014 and Japanese Patent Application No. 2014-056534, filed Mar. 19, 2014 are expressly incorporated by reference herein.

BACKGROUND

1. Technical Field

The present invention relates to a projector, a display device, a display system, and a control method of a display device.

2. Related Art

A display system in which a plurality of electronic apparatuses is connected to a projector as a display device, an electronic apparatus selected from the connected electronic apparatuses is set as a picture source, and an image according to a picture signal input from the picture source is projected onto a screen has been known. Regarding this system, a technology in which a projector projects a screen image of a plurality of PCs connected to the projector onto a screen as a thumbnail in order to allow a user to select a picture source is disclosed in Japanese Patent No. 5295500. The user selects a PC which is the picture source by manipulating a remote controller with reference to the displayed thumbnail. A technology in which a user manipulates an image for changing a configuration displayed on a terminal device, and thus the terminal device which is a picture source is changed is disclosed in JP-A-2011-191499.

In the technology disclosed in Japanese Patent No. 5295500, when a screen image similar to a plurality of PCs is displayed, or when resolution of the PC is higher than a maximum resolution of a projector which is the display device, it is difficult to identify the PC which is the picture source with reference to the thumbnail. In the technology disclosed in JP-A-2011-191499, a presenter has to manipulate the terminal device in order to change the terminal device of which the screen image is projected onto the screen.

SUMMARY

An advantage of some aspects of the invention is to allow an electronic apparatus in which a display according to a picture signal is performed to be selected on a display screen.

An aspect of the invention is directed to a projector including an optical modulation section modulating incident light; a projection section projecting light which is modulated by the optical modulation section onto a projection surface; a driving section driving the optical modulation section according to a projection image; a selection section selecting at least one electronic apparatus from a plurality of electronic apparatuses; a storage section storing a user identifier identifying each user of the plurality of electronic apparatuses; a reception section receiving an input on the projection surface; and a projection image creation section creating the projection image on the basis of a picture signal from an electronic apparatus which is selected by the selection section, in which the projection image creation section includes a first reflection section reflecting an image drawn on the basis of the input received by the reception section onto the projection image, and a second reflection section creating a selection image which is an image for selecting at least one user from the respective users of the plurality of electronic apparatuses and includes the user identifier stored in the storage section, and reflecting the selection image onto the projection image, and when an input for selecting the user is received by the reception section, the selection section sets an electronic apparatus corresponding to the selected user to a selected electronic apparatus on the projection surface onto which the projection image reflecting the selection image is projected. In this case, the electronic apparatus in which a projection according to the picture signal is performed is selected on the projection surface.

In another preferred aspect, the storage section stores data indicating a spatial positional relationship of the respective users of the plurality of electronic apparatuses, and the second reflection section creates the selection image in which the user identifier is arranged according to the positional relationship indicated by the data, and reflects the selection image onto the projection image. According to the projector of this configuration, manipulation for selecting a user becomes easy compared to a case where the user identifier is not arranged according to the spatial positional relationship of the user.

In another preferred aspect, the selection section determines the number of electronic apparatuses to be selected according to the number of users selected on the projection surface onto which the projection image reflecting the selection image is projected. According to the projector of this configuration, it is not necessary to perform manipulation designating the number of electronic apparatuses in addition to user selection.

In another preferred aspect, the selection image indicates a state of a user identified by the user identifier. According to the projector of this configuration, the state of the user is grasped from the selection image.

In another preferred aspect, the state of the user is whether or not the user logs into an electronic apparatus which is used by the user. According to the projector of this configuration, whether or not the user logs into the electronic apparatus is grasped from the selection image.

In another preferred aspect, the state of the user is whether or not the user performs a predetermined input with respect to the electronic apparatus. According to the projector of this configuration, whether or not the user performs a predetermined input with respect to the electronic apparatus is grasped from the selection image.

In another preferred aspect, the state of the user is whether or not each of the electronic apparatuses used by the user is selected by the selection section. According to the projector of this configuration, whether or not a projection according to the picture signal is performed with respect to each of the electronic apparatuses used by the user is grasped from the selection image.

In another preferred aspect, the projector further includes a restriction section restricting the user identifier from being newly stored in the storage section when a user identifier which is not stored in the storage section is acquired from any electronic apparatus of the plurality of electronic apparatuses. According to the projector of this configuration, when the user identifier which is not stored in the storage section is acquired, the selection image including the user identifier is prevented from being displayed.

Another aspect of the invention is directed to a display device including a display section displaying a display image on a display screen; a selection section selecting at least one electronic apparatus from a plurality of electronic apparatuses; a storage section storing a user identifier identifying each user of the plurality of electronic apparatuses; a reception section receiving an input on the display surface; and a display image creation section creating the display image on the basis of a picture signal from an electronic apparatus which is selected by the selection section, in which the display image creation section includes a first reflection section reflecting an image drawn on the basis of the input received by the reception section onto the display image, and a second reflection section creating a selection image which is an image for selecting at least one user from the respective users of the plurality of electronic apparatuses and includes the user identifier stored in the storage section, and reflecting the selection image onto the display image, and when an input for selecting the user is received by the reception section, the selection section sets an electronic apparatus corresponding to the selected user to a selected electronic apparatus on the display screen on which the display image reflecting the selection image is displayed. In this case, the electronic apparatus in which a display according to the picture signal is performed is selected on the display screen.

Still another aspect of the invention is directed to a display system including a plurality of electronic apparatuses; and a display device, in which the plurality of electronic apparatuses includes an output section outputting a picture signal to the display device, the display device includes a display section displaying a display image on a display screen, a selection section selecting at least one electronic apparatus from the plurality of electronic apparatuses, a storage section storing a user identifier identifying each user of the plurality of electronic apparatuses, a reception section receiving an input on the display surface, and a display image creation section creating the display image on the basis of a picture signal output from an electronic apparatus selected by the selection section, the display image creation section includes a first reflection section reflecting an image drawn on the basis of the input received by the reception section onto the display image, and a second reflection section creating a selection image which is an image for selecting at least one user from the respective users of the plurality of electronic apparatuses and includes the user identifier stored in the storage section, and reflecting the selection image onto the display image, and when an input for selecting the user is received by the reception section, the selection section sets an electronic apparatus corresponding to the selected user to a selected electronic apparatus on the display screen on which the display image reflecting the selection image is displayed. In this case, the electronic apparatus in which a display according to the picture signal is performed is selected on the display screen.

Yet another aspect of the invention is directed to a control method of a display device which includes a display section displaying a display image according to a picture signal received from an electronic apparatus on a display screen, a reception section receiving an input on the display screen, and a storage section storing data including (A) storing a user identifier identifying each user of a plurality of electronic apparatuses in the storage section; (B) selecting at least one electronic apparatus from the plurality of electronic apparatuses; (C) reflecting an image drawn on the basis of the input received by the reception section onto the display image; (D) creating a selection image which is an image for selecting at least one user from the respective users of the plurality of electronic apparatuses and includes the user identifier stored in the storage section, and reflecting the selection image onto the display image; and (E) setting an electronic apparatus corresponding to a user selected by the input which is received by the reception section to a selected electronic apparatus in a state in which a display image reflecting the selection image created in (D) is displayed. In this case, the electronic apparatus in which a display according to the picture signal is performed is selected on the display screen.

BRIEF DESCRIPTION OF THE DRAWINGS

The invention will be described with reference to the accompanying drawings, wherein like numbers reference like elements.

FIG. 13 is a diagram illustrating an example of a seating chart menu image.

FIGS. 14A and 14B are diagrams illustrating an example of a seating chart preparation image.

DESCRIPTION OF EXEMPLARY EMBODIMENTS

1. Configuration

Figure 1:
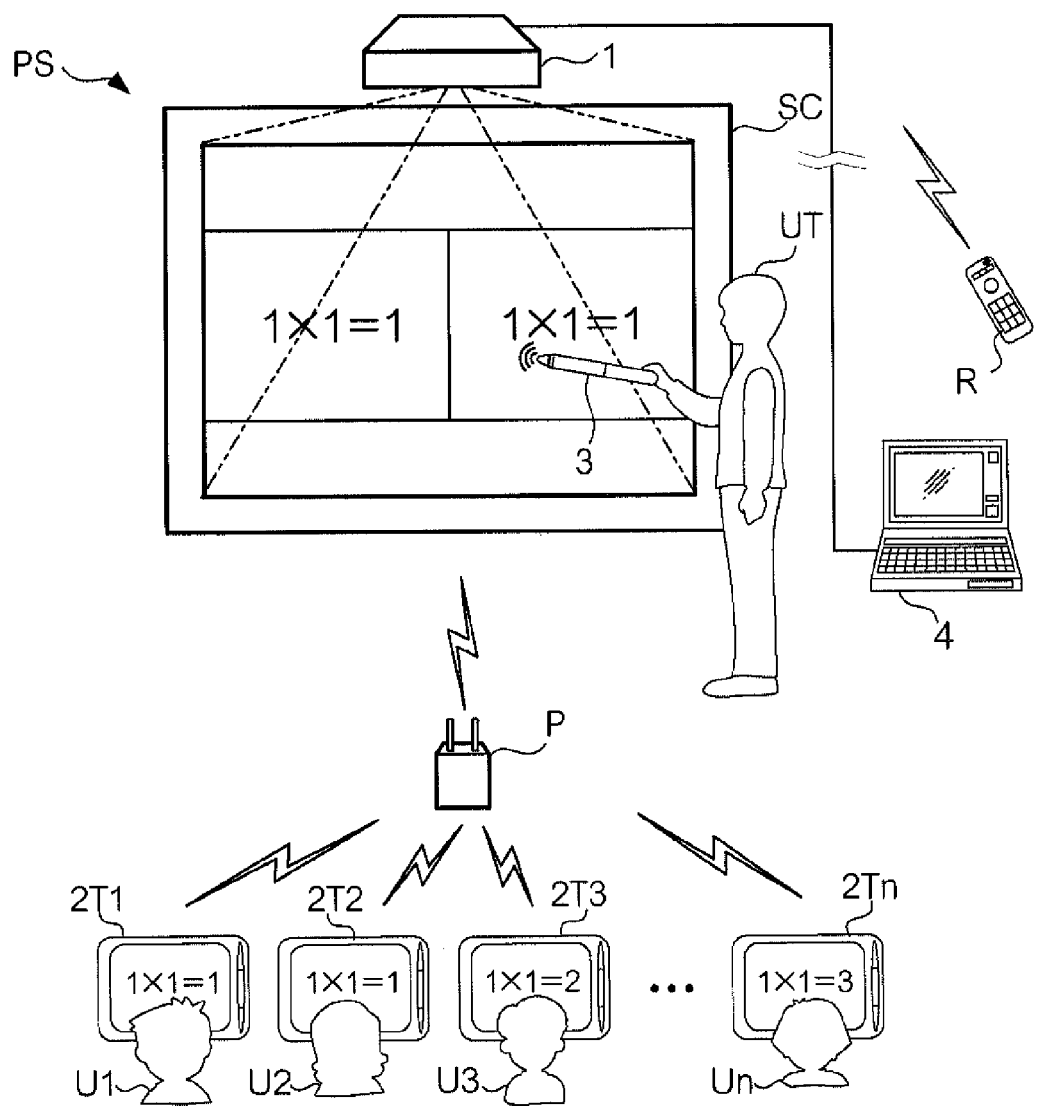
FIG. 1 is a diagram illustrating an entire configuration of a projection system.

FIG. 1 is a diagram illustrating an entire configuration of a projection system PS according to an embodiment of the invention. The projection system PS includes a projector 1, a plurality of tablet terminals 2 (2T1 to 2Tn), an indicator 3, a personal computer 4, a controller R, and a screen SC. The projector 1 is a device which projects an image (hereinafter, referred to as an "input image") indicated by a picture signal input from an electronic apparatus which is a picture source onto the screen SC. The projector 1 is a front projection-type short focus projector, and is arranged in a position relatively close to the screen SC. In an example of FIG. 1, the projector 1 is arranged in an upper portion of the screen SC. The tablet terminal 2 is an electronic apparatus which outputs a picture signal to the projector 1. The tablet terminal 2 includes a touch panel for writing characters or graphics which are electronically handwritten by a user U (U1 to Un). The tablet terminal 2 is connected to the projector 1 through an access point P in a wireless manner.

The indicator 3 is a pen-type or rod-like manipulation device used as a writing material when a user UT writes characters or graphics which are electronically handwritten with respect to an image (hereinafter, referred to as a "projection image") projected from the projector 1. In addition, the indicator 3 is used for inputting an indication with respect to the projector 1 on a projection surface. The projector 1 has a function of continuously specifying a position of the indicator 3 on the screen SC. The personal computer 4 (hereinafter, referred to as "PC 4") is an electronic apparatus used for managing the projection system PS. In the example of FIG. 1, the PC 4 is used by the user UT. The PC 4 is connected to the projector 1 by a Universal Serial Bus (USB) cable in a wired manner. The controller R is a device for controlling the projector 1 in a wireless manner such as infrared communication, that is, a so-called remote controller. The screen SC is a flat surface producing the projection image.

In the projection system PS, the projector 1 projects an image according to the picture signal output from at least one tablet terminal 2 selected from the plurality of tablet terminals 2 onto the screen SC. The projector 1 has a function of projecting the image according to the picture signal output from the plurality of tablet terminals 2 onto the screen SC in a row according to the input indication. In the example of FIG. 1, the projector 1 projects an image according to a picture signal output from a tablet terminal 2T1, and an image according to a picture signal output from a tablet terminal 2T2 onto the screen SC in a row. In the projection system PS, an indication for selecting the tablet terminal 2 of which the image is projected onto the screen SC, and an indication for designating the number of images projected onto the screen SC in a row are input through the indicator 3 on the projection surface. Therefore, in the example of FIG. 1, the user UT using the indicator 3 has authorization to input the indication for selecting the tablet terminal 2 of which the image is projected onto the screen SC, and the indication designating the number of images projected on the screen SC in a row.

Figure 2:
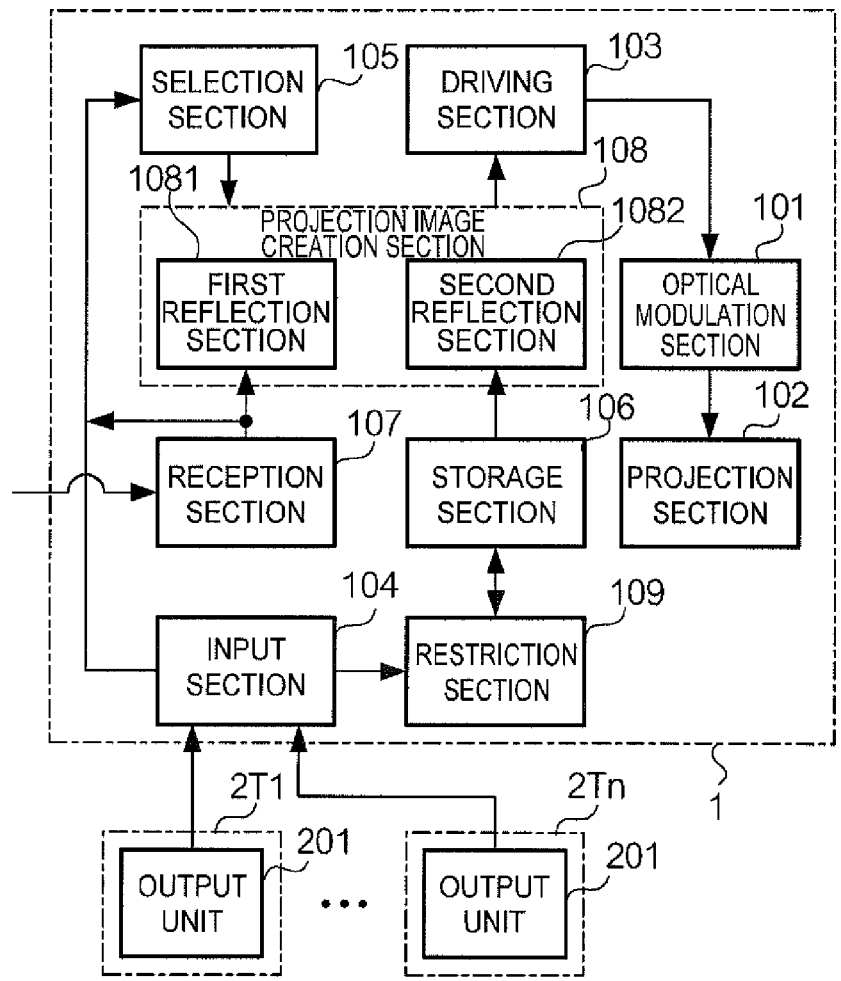
FIG. 2 is a block diagram illustrating a functional configuration of the projection system.

FIG. 2 is a block diagram illustrating a functional configuration of the projection system PS. FIG. 2 illustrates a functional configuration of the projector 1 and the tablet terminal 2 among various devices used in the projection system PS. The projector 1 includes an optical modulation section 101, a projection section 102, a driving section 103, an input section 104, a selection section 105, a storage section 106, a reception section 107, a projection image creation section 108, and a restriction section 109. The optical modulation section 101 modulates incident light. The projection section 102 (an example of a display section) projects light modulated by the optical modulation section 101 onto the projection surface. The driving section 103 drives the optical modulation section 101 according to the projection image. The input section 104 receives an input of the picture signal from at least one tablet terminal 2 among the plurality of tablet terminals 2. The selection section 105 selects at least one tablet terminal 2 from the plurality of tablet terminals 2. The storage section 106 stores a user identifier identifying each user (users U1 to Un) of the plurality of tablet terminals 2.

The reception section 107 receives an input by the user UT on the projection surface. The projection image creation section 108 creates a projection image on the basis of the picture signal from the tablet terminal 2 selected by the selection section 105. The projection image creation section 108 includes a first reflection section 1081 and a second reflection section 1082. The first reflection section 1081 reflects an image drawn on the basis of the input received by the reception section 107 onto the projection image. The second reflection section 1082 creates a selection image which is an image for selecting at least one user from the respective users of the plurality of tablet terminals 2 and includes the user identifier stored in the storage section 106, and reflects the selection image onto the projection image. When an input for selecting the user is received by the reception section 107, the selection section 105 sets the tablet terminal 2 corresponding to the selected user to a selected tablet terminal 2 on the projection surface onto which the projection image reflecting the selection image is projected. When the user identifier which is not stored in the storage section 106 is acquired from tablet terminal 2 of the plurality of tablet terminals 2, the restriction section 109 restricts the user identifier from being newly stored in the storage section 106. The tablet terminal 2 includes an output unit 201 which outputs the picture signal to the projector 1.

Figure 3:
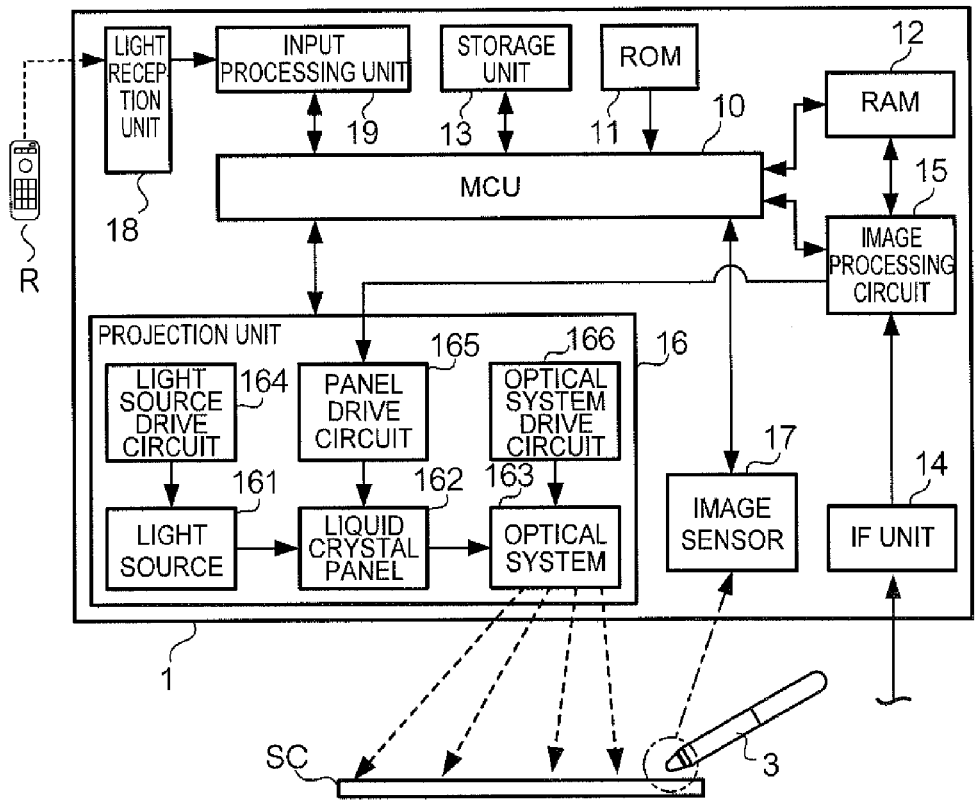
FIG. 3 is a block diagram illustrating a hardware configuration of a projector.

FIG. 3 is a block diagram illustrating a hardware configuration of the projector 1. The projector 1 includes a Micro Control Unit (MCU) 10, a Read Only Memory (ROM) 11, a Random Access Memory (RAM) 12, a storage unit 13, an interface (IF) unit 14, an image processing circuit 15, a projection unit 16, an image sensor 17, a light reception unit 18, and an input processing unit 19. The MCU 10 is a control device which controls each unit of the projector 1 by executing a program. The ROM 11 is a non-volatile storage device which stores various programs and data items. The ROM 11 stores the program executed by the MCU 10. The RAM 12 is a volatile storage device which stores data. The RAM 12 includes a frame memory which stores an image for each frame. In this example, the RAM 12 includes a frame memory (referred to as an "input image frame memory") which stores an input image, and a frame memory (referred to as a "handwritten frame memory") which stores an electronically handwritten image. The storage unit 13 is a storage device which stores data and programs.

The IF unit 14 performs communication with an external device such as the tablet terminal 2 and the PC 4. The IF unit 14 includes various terminals (for example, a VGA terminal, a USB terminal, a wired or wireless LAN interface, an S terminal, an RCA terminal, an HDMI (registered trademark) (High-Definition Multimedia Interface: registered trademark) terminal, and the like) for being connected to the external device. In this embodiment, the IF unit 14 performs communication with the tablet terminal 2 through the wireless LAN interface. In addition, the IF unit 14 performs communication with the PC 4 through the USB terminal. The image processing circuit 15 performs a predetermined image processing with respect to an input image. The image processing circuit 15 writes an image after being subjected to the image processing in the frame memory.

The projection unit 16 includes a light source 161, a liquid crystal panel 162, an optical system 163, a light source drive circuit 164, a panel drive circuit 165, and an optical system drive circuit 166. The light source 161 includes a lamp such as a high pressure mercury lamp, a halogen lamp, or a metal halide lamp, or a solid light source such as a Light Emitting Diode (LED) or a laser diode, and irradiates the liquid crystal panel 162 with light. The liquid crystal panel 162 is a light modulator which modulates the light emitted from the light source 161 according to the image data. In this example, the liquid crystal panel 162 is a transmissive liquid crystal panel, and controls transmittance of each pixel according to the image data. The projector 1 includes three liquid crystal panels 162 corresponding to three primary colors of RGB. The light from the light source 161 is divided into colored light rays of three colors of RGB, and each colored light is incident on the corresponding liquid crystal panel 162. The colored light modulated through each liquid crystal panel is combined by a cross dichroic prism or the like, and is ejected to the optical system 163. The optical system 163 includes a lens which magnifies the light modulated into image light by the liquid crystal panel 162, and projects the light onto the screen SC, and a zoom lens which magnifies and reduces an image to be projected, and adjusts a focal point. The light source drive circuit 164 drives the light source 161 according to control of the MCU 10. The panel drive circuit 165 drives the liquid crystal panel 162 according to the image data output from the image processing circuit 15. The optical system drive circuit 166 drives the optical system 163 according to the control of the MCU 10, and adjusts a degree of zoom and focus.

The image sensor 17 is a solid-state image sensing device group which images the screen SC and creates image data in order to specify the position of the indicator 3 on the screen SC. The image sensor 17, for example, is configured by a CMOS image sensor, a CCD image sensor, or the like. The projector 1 includes a plurality of image sensors 17 (an image sensor group), and the image sensors 17 image the screen SC at an angle of view including a maximum range in which the projection unit 16 is able to project the projection image. The MCU 10 specifies a trajectory of the indicator 3 from the image data imaged by the image sensor 17, and rewrites the handwritten frame memory according to the specified trajectory. In addition, the image processing circuit 15 combines an input image stored in the input image frame memory and a handwritten image stored in the handwritten frame memory, and outputs image data indicating the combined image to the panel drive circuit 165.

The light reception unit 18 receives an infrared signal transmitted from the controller R, decodes the received infrared signal, and outputs the signal to the input processing unit 19. The input processing unit 19 creates information indicating contents manipulated by the controller R, and outputs the information to the MCU 10.

In the projector 1, the liquid crystal panel 162 is an example of the optical modulation section 101. The optical system 163 is an example of the projection section 102. The panel drive circuit 165 controlled by the MCU 10 which executes a program is an example of the driving section 103. The IF unit 14 controlled by the MCU 10 which executes a program is an example of the input section 104. The MCU 10 executing a program is an example of the selection section 105 and the restriction section 109. The RAM 12 and the storage unit 13 are an example of the storage section 106. The image sensor 17 controlled by the MCU 10 which executes a program is an example of the reception section 107. The image processing circuit 15 controlled by the MCU 10 which executes a program is an example of the projection image creation section 108.

Figure 4:
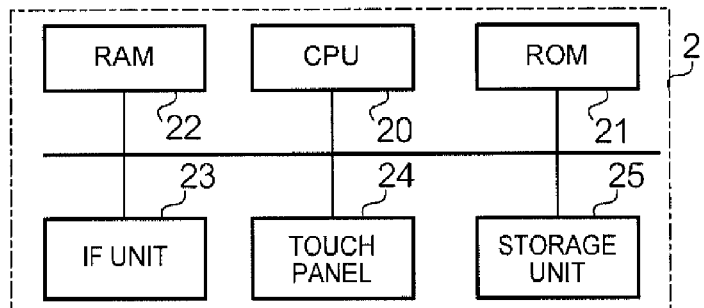
FIG. 4 is a block diagram illustrating a hardware configuration of a tablet terminal.

FIG. 4 is a block diagram illustrating a hardware configuration of the tablet terminal 2. The tablet terminal 2 includes a CPU 20, a ROM 21, a RAM 22, an IF unit 23, a touch panel 24, and a storage unit 25. The CPU 20 is a control device which controls each unit of the tablet terminal 2 by executing a program. The ROM 21 is a non-volatile storage device which stores various programs and data items. The RAM 22 is a volatile storage device which stores data. The IF unit 23 performs communication with an external device such as the projector 1. The IF unit 23 includes a wireless LAN interface for being connected to the projector 1. The touch panel 24 is an input device in which a panel perceiving a coordinate is superimposed on a surface of a display such as liquid crystal display. As the touch panel 24, for example, an optical touch panel, a resistive film-type touch panel, an electrostatic capacitance-type touch panel, or an ultrasonic touch panel is used. The storage unit 25 is a storage device which stores data and programs. In the tablet terminal 2, the IF unit 23 controlled by the CPU 20 which executes a program is an example of the output unit 201.

Figure 5:
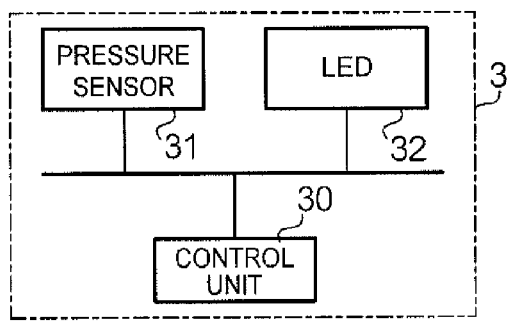
FIG. 5 is a block diagram illustrating a hardware configuration of an indicator.

FIG. 5 is a block diagram illustrating a hardware configuration of the indicator 3. The indicator 3 includes a control unit 30, a pressure sensor 31, and a Light Emitting Diode (LED) 32. The control unit 30 is a control device which controls an operation of each unit of the indicator 3. The pressure sensor 31 is disposed on a tip of the indicator 3, and detects a pressure on the tip of the indicator 3. The LED 32 outputs light of an intrinsic wavelength to the indicator 3. When the pressure on the tip of the indicator 3 is detected, the control unit 30 controls the LED 32 such that the light is output.

Figure 6:
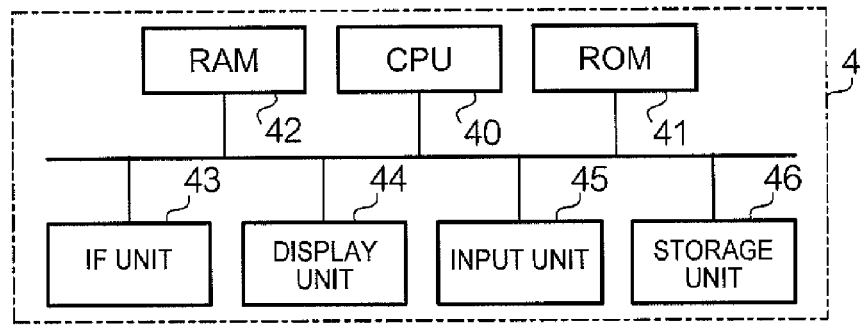
FIG. 6 is a block diagram illustrating a hardware configuration of a PC.

FIG. 6 is a block diagram illustrating a hardware configuration of the PC 4. The PC 4 includes a CPU 40, a ROM 41, a RAM 42, an IF unit 43, a display unit 44, an input unit 45, and a storage unit 46. The CPU 40 is a control device which controls each portion of the PC 4 by executing a program. The ROM 41 is a non-volatile storage device which stores various programs and data items. The RAM 42 is a volatile storage device which stores data. The IF unit 43 performs communication with an external device such as the projector 1. The IF unit 43 includes various terminals for being connected to the external device. The display unit 44 includes a display device such as a liquid crystal display or an organic Electroluminescence (EL) display. The input unit 45 is an input device which receives an input by the user, and includes a keyboard, a mouse, a touch panel, various buttons, and the like. The storage unit 46 is a storage device which stores data and programs, and for example, is a Hard Disk Drive (HDD).

2. Operation

Figure 7:
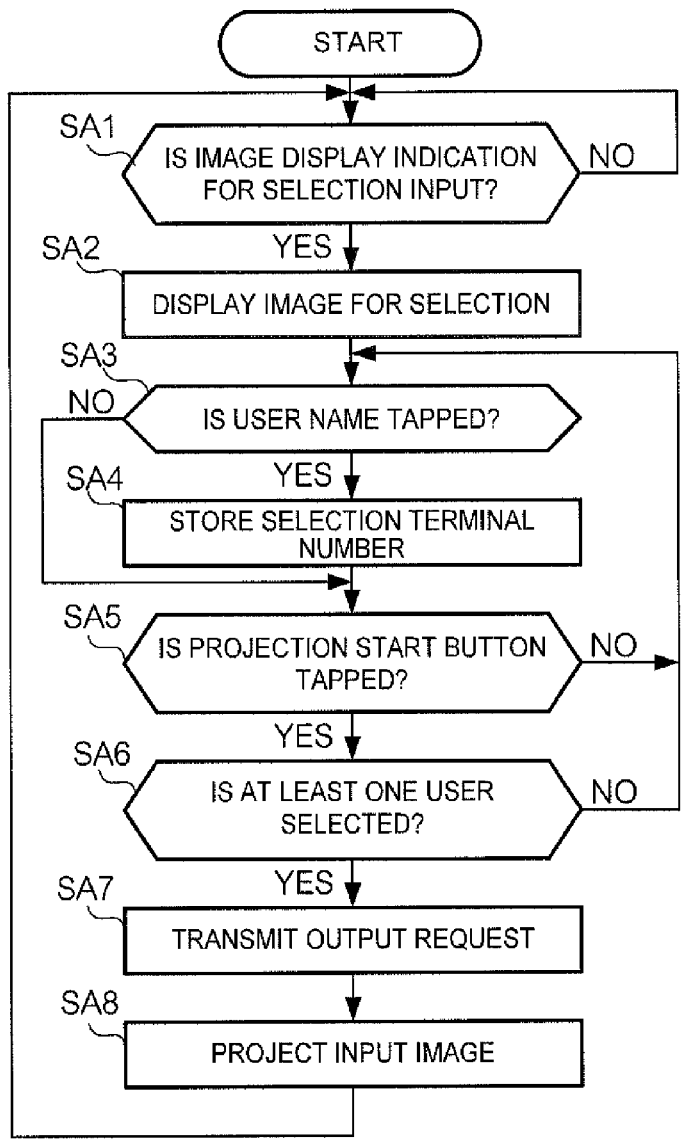
FIG. 7 is a flowchart illustrating a selection processing of a picture source.

FIG. 7 is a flowchart illustrating a selection processing of the picture source of the projector 1. The following processing is started in a state where the projector 1 is connected to each of the tablet terminals 2 in a wireless manner. In each of the tablet terminals 2, an application and program for outputting a picture signal according to a request from the projector 1 is installed in advance. The user U inputs (logs into) a user name and a password into the tablet terminal 2 to be used by the user, and activates the application and program. Furthermore, when the application and program is activated, the user name (an example of the user identifier) of the user using the tablet terminal 2, and a terminal number (an example of a device identifier) of the tablet terminal 2 are transmitted to the projector 1. As the terminal number of the tablet terminal 2, for example, a Media Access Control address (MAC) address is used. The projector 1 stores the user name and the terminal number acquired from the tablet terminal 2 in the RAM 12 in association with each other. Therefore, in the RAM 12, the user name and the terminal number of the user U who logs into the tablet terminal 2 are stored.

In Step SA1, the MCU 10 determines whether or not an indication for displaying an image for selection (hereinafter, referred to as an "image display indication for selection") is input. The projector 1 projects a graphical user interface (hereinafter, referred to as a "tool pallet") including a plurality of icons for receiving an input of various indications with respect to the projector 1 onto the screen SC. The user UT manipulates the tool pallet by using the indicator 3, and thus the image display indication for selection is input. When it is determined that the image display indication for selection is input (SA1: YES), the MCU 10 allows the processing to proceed to Step SA2. When it is determined that the image display indication for selection is not input (SA1: NO), the MCU 10 waits for the processing. Furthermore, when the image display indication for selection is input in a state where the projector 1 is not connected to the tablet terminal 2 in a wireless manner, a message indicating that the tablet terminal 2 is not connected in a wireless manner may be displayed on the screen SC.

Figure 8:
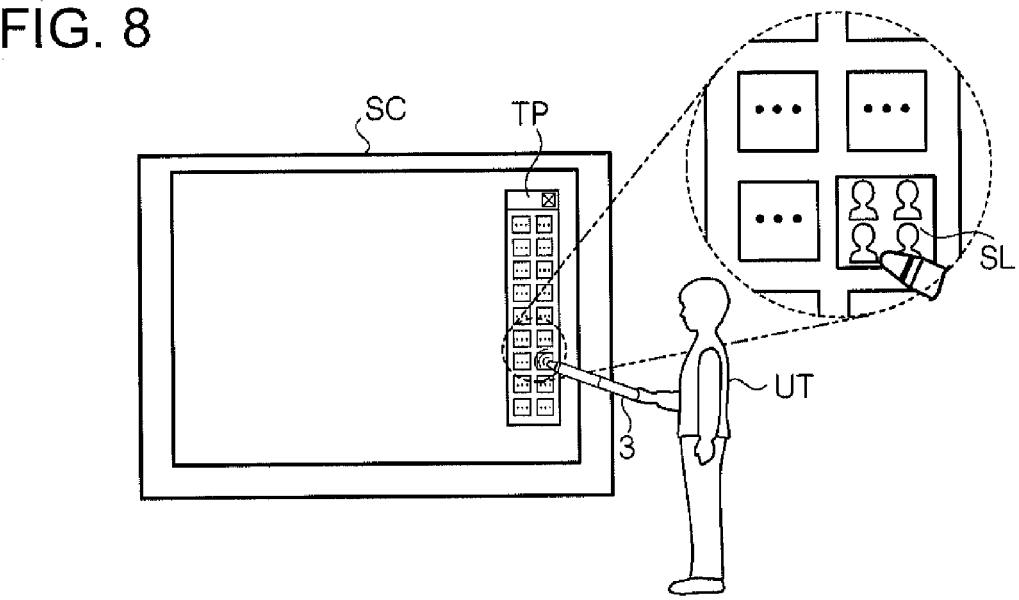
FIG. 8 is a diagram illustrating an input example of an image display indication for selection.

FIG. 8 is a diagram illustrating an input example of the image display indication for selection. In this example, a tool pallet TP is included in a region on a right side of the projection image. The user UT selects (here, taps (hereinafter, this operation is referred to as "tapping") the screen SC by using the indicator 3) an icon SL on the tool pallet TP, and thus the light is output from the LED 32, and the image display indication for selection is input. When it is specified that the indicator 3 touches the icon SL, the MCU 10 determines that the image display indication for selection is input.

FIG. 7 is referred to again. In Step SA2, the MCU 10 displays the image for selection. The MCU 10 reads out the user name from the RAM 12, and projects the image for selection including the user name.

Figure 9:
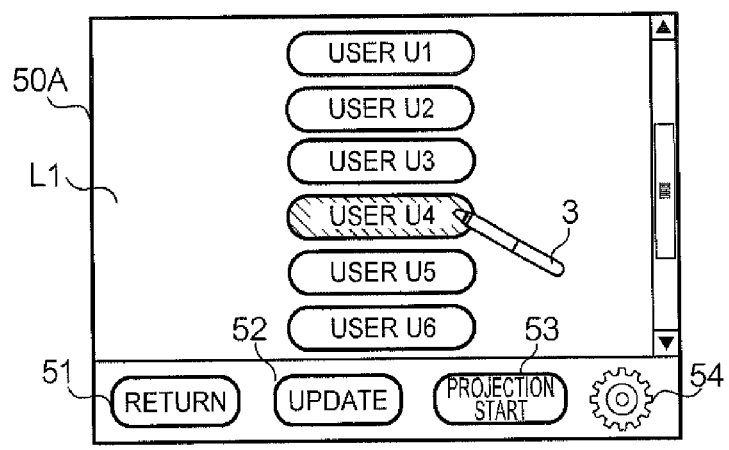
FIG. 9 is a diagram illustrating an example of an image for selection.

FIG. 9 is a diagram illustrating an example of the image for selection. An image for selection 50A includes a list display region L1, a return button 51, an update button 52, a projection start button 53, and a setting button 54. The list display region L1 is a region showing information for selecting at least one user from a plurality of users. A list of the user names (hereinafter, referred to as a "user name list") stored in the RAM 12 is displayed on the list display region L1. In an example of FIG. 9, user names from a user U1 to a user U6 are displayed on the list display region L1. That is, in the example of FIG. 9, the user U1 to the user U6 log into the tablet terminal 2 to be used by the user. A user is selected by tapping the user name. In FIG. 9, a user name in which a hatched line is displayed on a background indicates a user name which is currently selected. In FIG. 9, a user U4 is selected. In a state where the user name is selected, when the same user name is tapped again, the selection of the user name is cancelled. Hereinafter, a case where the maximum number of images which are able to be projected onto the screen SC in a row by the projector 1 is four will be described. Therefore, in the list display region L1, four user names are selected at a maximum. The number of images projected onto the screen SC in a row is switched according to the number of user names selected in the list display region L1. In a state where four user names are selected, when a fifth user name is newly selected, the selection of an initially selected user name is cancelled.

The return button 51 is a button for returning to the screen on which the tool pallet TP is displayed. The update button 52 is a button for updating the image for selection 50. In the image for selection 50A, when the update button 52 is tapped, contents of the list display region L1 are updated. For example, when a user U7 newly logs into a tablet terminal 2T7, the update button 52 is tapped, and thus the user U7 is newly displayed on the list display region L1. The projection start button 53 is a button for projecting the input image from the tablet terminal 2 corresponding to the selected user name. The setting button 54 is a button for performing various settings with respect to the image for selection 50.

Figure 10:
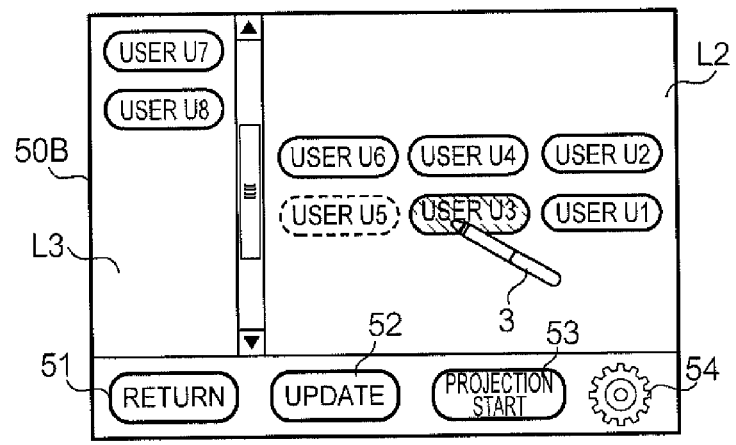
FIG. 10 is a diagram illustrating another example of the image for selection.

FIG. 10 is a diagram illustrating another example of the image for selection. An image for selection 50B includes a seating chart display region L2 and a non-registrant display region L3 in addition to the buttons illustrated in FIG. 9. The user name is displayed on the seating chart display region L2 according to a spatial positional relationship (for example, a seating chart of the user U) of the user U using the tablet terminal 2. Data indicating the spatial positional relationship of the user U (hereinafter, referred to as "seating chart data") is stored in the storage unit 13 in advance. A method of registering the seating chart data in the projector 1 will be described later.

A non-registrant display region L3 is a region on which the user name which is not included in the seating chart data is displayed. In FIG. 10, a user is selected by tapping the user name displayed on the seating chart display region L2 or the non-registrant display region L3. In FIG. 10, a user U3 displayed on the seating chart display region L2 is tapped. Furthermore, for example, the user UT manipulates the setting button 54 on the image for selection 50A illustrated in FIG. 9, and thus the image for selection 50B is displayed. The manipulation for displaying the image for selection 50B will be described later in detail.

Furthermore, the image for selection 50 (50A or 50B) may indicate a state of the user U identified by the user name. In FIG. 10, as an example of the state of the user U, whether or not the user U logs into the tablet terminal 2 to be used by the user is indicated in the seating chart display region L2. Specifically, among the user names included in the seating chart display region L2, an outline of the user name which is not logged into the tablet terminal 2 yet is illustrated by a broken line. In an example of FIG. 10, a user U5 is not logged into a tablet terminal 2T5 yet. The projector 1 determines whether or not the user U is logged into the tablet terminal 2 according to whether or not the user name and the terminal number are acquired from the tablet terminal 2.

In the image for selection 503, when the update button 52 is tapped, contents of the seating chart display region L2 and the non-registrant display region L3 are updated. For example, when the user U5 newly logs into the tablet terminal 2T5, the update button 52 is tapped, and thus the outline of the user U5 in the seating chart display region L2 is changed to a solid line. Furthermore, a change in the user name according to a login is not limited to a case where the update button 52 is pressed. In addition, when a user U9 newly logs into a tablet terminal 2T9, the update button 52 is tapped, and thus the user U9 is newly displayed on the non-registrant display region L3.

FIG. 7 is referred to again. In Step SA3, the MCU 10 determines whether or not the user name is tapped on the image for selection 50. When it is determined that the user name is tapped (SA3: YES), the MCU 10 allows the processing to proceed to Step SA4. When it is determined that the user name is not tapped (SA3: NO), the MCU 10 allows the processing to proceed to Step SA5.

In Step SA4, the MCU 10 stores the terminal number (hereinafter, referred to as a "selected terminal number") corresponding to the user name tapped on the image for selection 50 in the RAM 12. Specifically, the MCU 10 specifies the selected terminal number on the basis of a correspondence relationship between the user name and the terminal number stored in the RAM 12, and stores the selected terminal number in the RAM 12 in distinction from other terminal numbers. Furthermore, when the selection of the user name is cancelled, the selected terminal number corresponding to the user name is deleted from the RAM 12. In Step SA5, the MCU 10 determines whether or not the projection start button 53 is tapped. When it is determined that the projection start button 53 is tapped (SA5: YES), the MCU 10 allows the processing to proceed to Step SA6. When it is determined that the projection start button 53 is not tapped (SA5: NO), the MCU 10 allows the processing to proceed to Step SA3.

In Step SA6, the MCU 10 determines whether or not at least one user is selected in the image for selection 50. Specifically, the MCU 10 determines whether or not the user is selected according to whether or not the selected terminal number is stored in the RAM 12. When it is determined that at least one user is selected (SA6: YES), the MCU 10 allows the processing to proceed to Step SA7. When it is determined that the user is not selected (SA6: NO), the MCU 10 allows the processing to proceed to Step SA3.

In Step SA7, the MCU 10 transmits a request (hereinafter, referred to as an "output request") for starting an output of the picture signal to the tablet terminal 2. Specifically, the MCU 10 transmits the output request to the tablet terminal 2 which is specified by the selected terminal number stored in the RAM 12. When the output request is received from the projector 1, the tablet terminal 2 outputs the picture signal to the projector 1. In Step SA8, the MCU 10 projects the input image onto the screen SC. When the picture signal is input from the plurality of tablet terminals 2, the MCU 10 projects a plurality of input images onto the screen SC in a row. Furthermore, when the selected terminal number is stored in the RAM 12 in Step SA4, the MCU 10 stores a sequence of the selected terminal numbers stored in the RAM 12. When the picture signal is input from the plurality of tablet terminals 2, the MCU 10 projects the plurality of input images onto the screen SC in a row according to the sequence.

By the processing described above, the picture source is selected through the indicator 3 on the projection image. Therefore, the user UT is able to select the picture source without manipulating the PC 4 and the controller R. In addition, the user UT is able to perform the operation of writing electronically handwritten characters or images with respect to the projection image and the selection of the picture source without replacing the indicator 3. Further, the user name is displayed on the image for selection 50, and thus when the same screen image is displayed on the touch panel 24 of each of the tablet terminals 2, each of the tablet terminals 2 is easily identified compared to the thumbnail.

Figure 11:
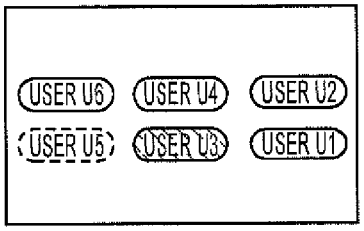
FIG. 11 is a diagram comparing manipulation of the image for selection with a configuration of a projection image.

FIG. 11 is a diagram comparing the manipulation of the image for selection 50 with a configuration of the projection image. FIG. 11 illustrates comparison between the manipulation of the seating chart display region L2 and the configuration of the projection image. Furthermore, when the list display region L1 is manipulated, the projection image is changed similarly to FIG. 11. In a first line of FIG. 11, the user U3 is selected in the seating chart display region L2. In this state, when the projection start button 53 is tapped, an input image from a tablet terminal 2T3 is independently projected. Furthermore, in FIG. 11, for convenience of description, the input image is illustrated by being simplified into the user name.

In a second line, the user U3 and a user U2 are selected in the seating chart display region L2. In this state, when the projection start button 53 is tapped, the input image from the tablet terminal 2T3, and the input image from the tablet terminal 2T2 are projected in a row. In this example, the input image from the tablet terminal 2T3 which is previously selected is displayed on a left side of the projection image, and the input image from the tablet terminal 2T2 which is selected later is displayed on the right side of the projection image.

In a third line, the user U3, the user U2, and the user U6 are selected in the seating chart display region L2. In this state, when the projection start button 53 is tapped, the input image from the tablet terminal 2T3, the input image from the tablet terminal 2T2, and an input image from a tablet terminal 2T6 are projected in a row. In this example, the input images are displayed on an upper-left side, an upper-right side, and a lower-left side of the projection image according to the sequence of the picture source selected.

In a fourth line, the user U3, the user U2, the user U6, and the user U1 are selected in the seating chart display region L2. In this state, when the projection start button 53 is tapped, the input image from the tablet terminal 2T3, the input image from the tablet terminal 2T2, the input image from the tablet terminal 2T6, and the input image from the tablet terminal 2T1 are projected in a row. In this example, the input images are displayed on the upper-left side, the upper-right side, the lower-left side, and a lower-right side of the projection image according to the sequence of the picture source selected. Next, a method of registering the seating chart data in the projector 1 will be described.

Figure 12:
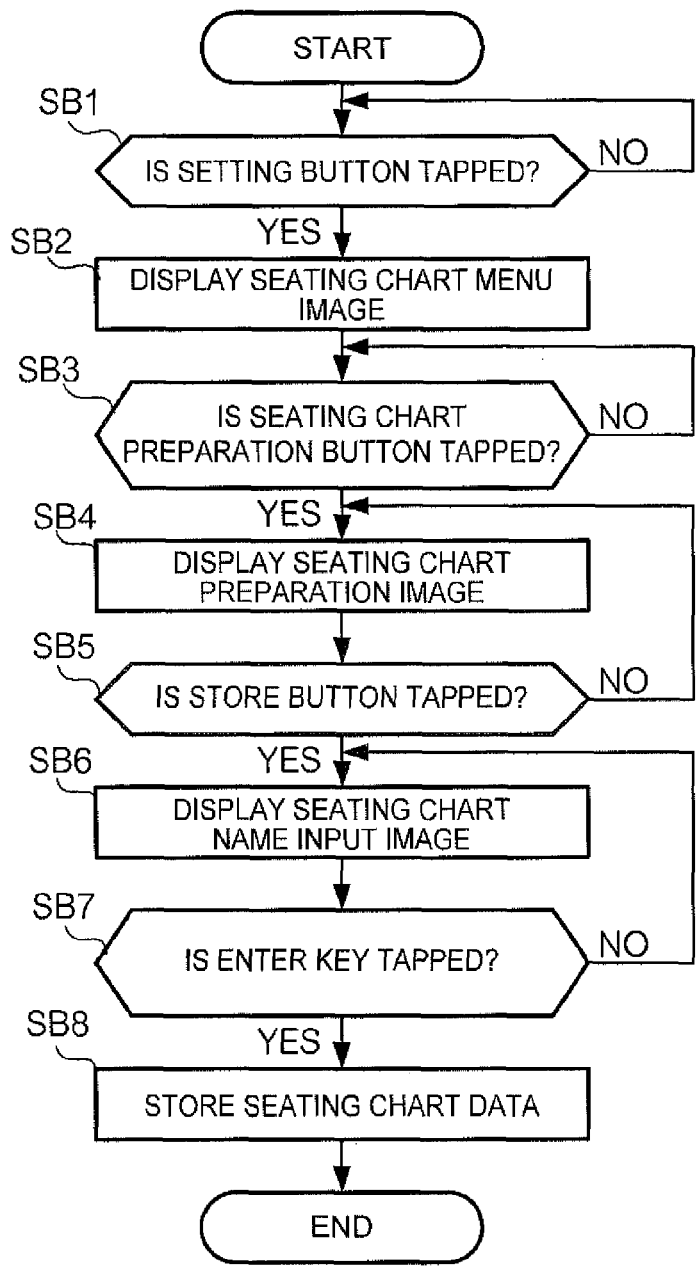
FIG. 12 is a flowchart illustrating a registration processing of seating chart data.

FIG. 12 is a flowchart illustrating a registration processing of the seating chart data of the projector 1. Similar to FIG. 7, the following processing is started in a state where the projector 1 is connected to each of the tablet terminals 2 in a wireless manner. The user U logs into the tablet terminal 2 to be used by the user, and activates the application and program described above. As a premise of the following processing, the user UT inputs the image display indication for selection, and displays the image for selection 50A on the screen SC.

In Step SB1, the MCU 10 determines whether or not the setting button 54 is tapped in the image for selection 50. When it is determined that the setting button 54 is tapped (SB1: YES), the MCU 10 allows the processing to proceed to Step SB2. When it is determined that the setting button 54 is not tapped (SB1: NO), the MCU 10 waits for the processing. In Step SB2, the MCU 10 displays a seating chart menu image. The seating chart menu image is an image for receiving various manipulations related to the seating chart data.

FIG. 13 is a diagram illustrating an example of the seating chart menu image. A seating chart menu image 60 includes a seating chart preparation button 61, a seating chart edition button 62, an export button 63, an import button 64, a delete button 65, a seating chart determination button 66, and a return button 67. The seating chart preparation button 61 is a button for starting the registration of the seating chart data. The seating chart edition button 62 is a button for editing the registered seating chart data. The export button 63 is a button for exporting the registered seating chart data. The import button 64 is a button for importing the prepared seating chart data in an external device such as the PC 4. The delete button 65 is a button for deleting the registered seating chart data. The seating chart determination button 66 is a button for selecting the seating chart data to be used. When the user UT taps the seating chart determination button 66, a list of the registered seating chart data is displayed. When the user UT selects one seating chart data from the list, the image for selection 50B according to the seating chart data is displayed. The return button 67 is a button for returning to the image for selection 50A.

FIG. 12 is referred to again. In Step SB3, the MCU 10 determines whether or not the seating chart preparation button 61 is tapped. When it is determined that the seating chart preparation button 61 is tapped (SB3: YES), the MCU 10 allows the processing to proceed to Step SB4. When it is determined that the seating chart preparation button 61 is not tapped (SB3: NO), the MCU 10 waits for the processing. In Step S134, the MCU 10 displays a seating chart preparation image. The seating chart preparation image is an image for receiving the manipulation of registering the seating chart data in the projector 1.

FIGS. 14A and 14B are diagrams illustrating an example of the seating chart preparation image. A seating chart preparation image 70 includes a candidate display region L4, a grid region L5, a return button 71, and a store button 72. The candidate display region L4 is a region illustrating candidates of the user name included in the seating chart data. Similar to the list display region L1, a user name list is displayed on the candidate display region L4. In an example of FIGS. 14A and 14B, a plurality of user names is displayed on the candidate display region L4. The grid region L5 is a region for determining an arrangement of the user name indicated by the seating chart data. The arrangement of the user name is determined, for example, by dragging the user name displayed on the candidate display region L4 (the indicator 3 is moved while the tip of the indicator 3 presses the projection surface), and by dropping the user name onto the grid region L5 (the tip of the indicator 3 is separated from the projection surface) by using the indicator 3 by the user UT. In an example of FIG. 14A, the user U3 displayed on the candidate display region L4 is dragged and dropped onto the grid region L5. In the candidate display region L4, a user name of which a background is displayed by a hatched line indicates a user name which is dragged and a user name which is dropped onto the grid region L5. A grid line is displayed on the grid region L5 such that the user UT easily visually recognizes the arrangement of the user name. In an example of FIGS. 14A and 14B, 8×8 grid lines are displayed on the grid region L5. The user UT performs drag and drop with respect to the user name according to the spatial positional relationship of the user U using the tablet terminal 2. In an example of FIG. 14B, the user UT registers seating chart data indicating 3×3 seats of the users U1 to U9. The return button 71 is a button for returning to the seating chart menu image 60. The store button 72 is a button for storing the arrangement of the user name in the grid region L5.

FIG. 12 is referred to again. In Step SB5, the MCU 10 determines whether or not the store button 72 is tapped. When it is determined that the store button 72 is tapped (SB5: YES), the MCU 10 allows the processing to proceed to Step SB6. When it is determined that the store button 72 is not tapped (SB5: NO), the MCU 10 continuously displays the seating chart preparation image 70. Furthermore, when the store button 72 is pressed in a state where the user name is not dropped onto the grid region L5, the MCU 10 continuously displays the seating chart preparation image 70. In Step SB6, the MCU 10 displays a seating chart name input image. The seating chart name input image is an image for receiving an input of a name of the registered seating chart data.

Figure 15:
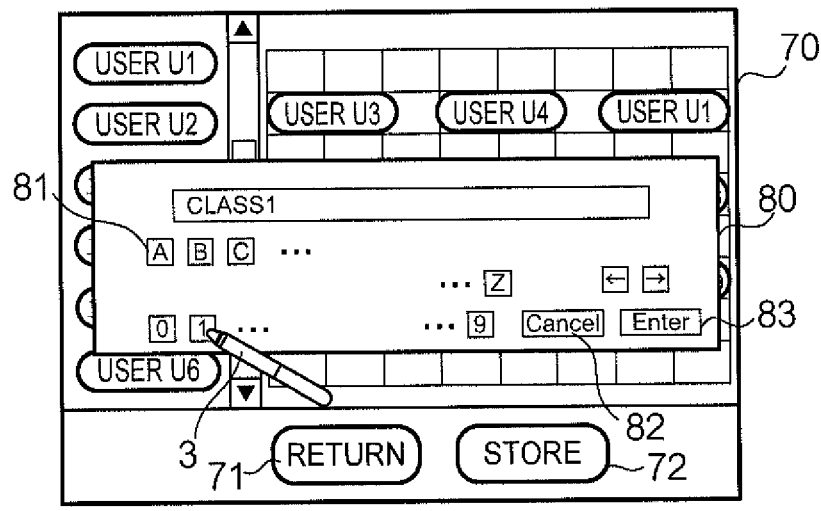
FIG. 15 is a diagram illustrating an example of a seating chart name input image.

FIG. 15 is a diagram illustrating an example of the seating chart name input image. In FIG. 15, a seating chart name input image 80 is displayed by being superimposed on the seating chart preparation image 70. The seating chart name input image 80 includes a plurality of input keys 81, a cancel key 82, and an enter key 83. The input key 81 is a button for receiving the input of the name. In an example of FIG. 15, the user UT taps the input keys 81, and inputs "CLASS1". The cancel key 82 is a button for cancelling the input of the name of the seating chart data. When the cancel key 82 is tapped, the display of the seating chart name input image 80 is ended, and the display of the seating chart preparation image 70 is continued. The enter key 83 is a button for determining the name of the seating chart data.

FIG. 12 is referred to again. In Step SB7, the MCU 10 determines whether or not the enter key 83 is tapped. When it is determined that the enter key 83 is tapped (SB7: YES), the MCU 10 allows the processing to proceed to Step SB8. When it is determined that the enter key 83 is not tapped (SB7: NO), the MCU 10 continuously displays the seating chart name input image 80.

In Step SB8, the MCU 10 stores the seating chart data in the storage unit 13. Specifically, the MCU 10 stores the user name dropped onto the grid region L5, and the arrangement which is based on the grid line of the user name in the storage unit 13 in association with each other. The MCU 10 adds an intrinsic ID (hereinafter, referred to as a "seating chart ID") allocated in the registered seating chart data and the name input into the seating chart name input image 80 to the seating chart data, and stores the seating chart data.

Figure 16:
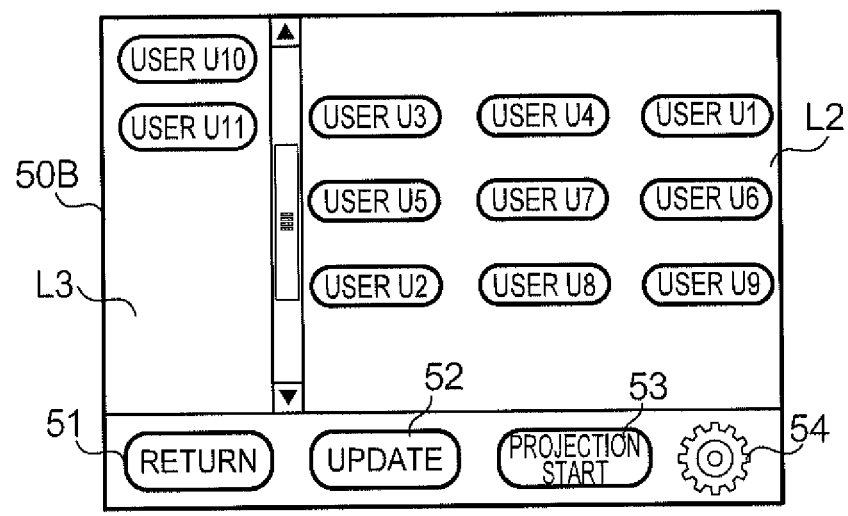
FIG. 16 is a diagram illustrating the image for selection.

FIG. 16 is a diagram illustrating the image for selection 50B displayed on the basis of the seating chart data of the CLASS1. The image for selection 50B illustrated in FIG. 16 is displayed, for example, by inputting the name (here, the "CLASS1") of the seating chart data after the seating chart determination button 66 of the seating chart menu image 60 is tapped.

As described above, when a processing of storing the seating chart data in the storage unit 13 is performed, and the image for selection 50B reflecting the spatial positional relationship of the user is displayed, the user UT easily intuitively grasps the arrangement of the user name. Therefore, the labor at the time of searching one user name from the plurality of user names included in the image for selection 50B by the user UT is reduced. Next, a utilization example of the image for selection 50B will be specifically described.

Figure 17:
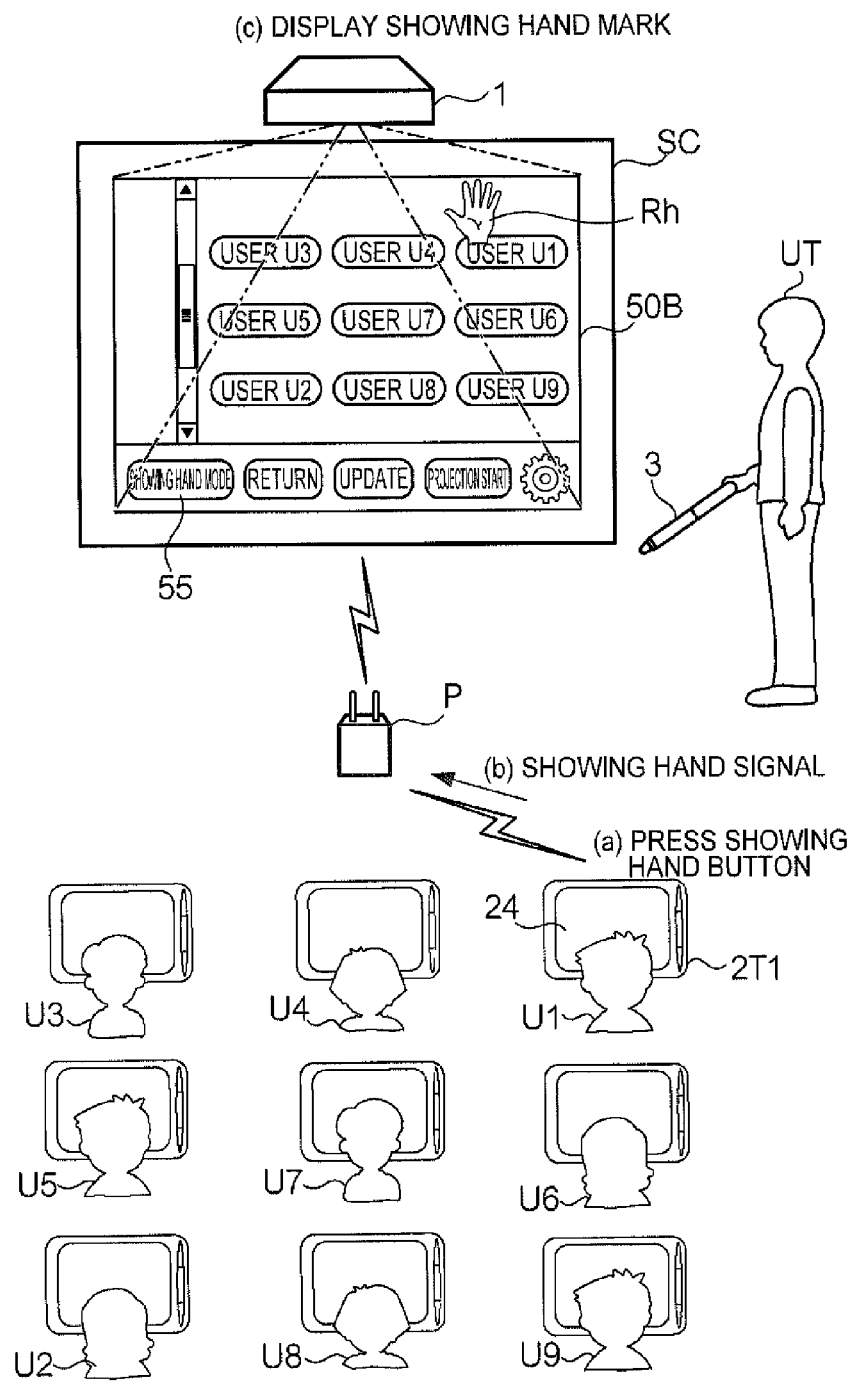
FIG. 17 is a diagram illustrating an utilization example of the image for selection.

FIG. 17 is a diagram illustrating a utilization example of the image for selection 50B. FIG. 17 illustrates an example when the projection system PS is used in a classroom in the school. In this example, the user UT is a teacher, and the users U1 to U9 are students. Questions to be solved by the student is displayed on the touch panel 24 of each of the tablet terminals 2, and the student inputs an answer with respect to the question into the touch panel 24. The image for selection 50B reflecting seats of the students in the classroom is projected onto the screen SC. The teacher manipulates the image for selection 50B, and selects a picture source from the plurality of tablet terminals 2.

In addition, in FIG. 17, a showing hand mode is executed by the projector 1 and each of the tablet terminals 2. The showing hand mode is a function of illustrating whether or not the user U performs an input corresponding to the showing hand (an example of a determined input, hereinafter, simply referred to as "showing hand") with respect to the tablet terminal 2 in the image for selection 50B. The showing hand mode, for example, is started by the projector 1 and the tablet terminal 2 when a showing hand mode button 55 included in the image for selection 50B is tapped. When the showing hand mode button 55 is tapped, the projector 1 transmits a signal for starting the showing hand mode (hereinafter, referred to as a "showing hand mode start signal") to each of the tablet terminals 2. When the showing hand mode start signal is received, each of the tablet terminals 2 displays a showing hand button on the touch panel 24. The showing hand button is a button for performing the showing hand by the user U. When the showing hand button is pressed, the tablet terminal 2 transmits a signal indicating that the user U performs the showing hand (hereinafter, referred to as a "showing hand signal") to the projector 1 ((a) and (b) of FIG. 17). When the showing hand signal is received, the projector 1 displays the user name of the user U who performs the showing hand in distinction from other user names. In FIG. 17, the user U1 performs the showing hand, and a mark Rh indicating that the showing hand is performed (hereinafter, referred to as a "showing hand mark") is displayed on the user U1 of the image for selection 50B. The teacher selects a picture source from the plurality of tablet terminals 2 with reference to the showing hand mark Rh.

Figure 18A:
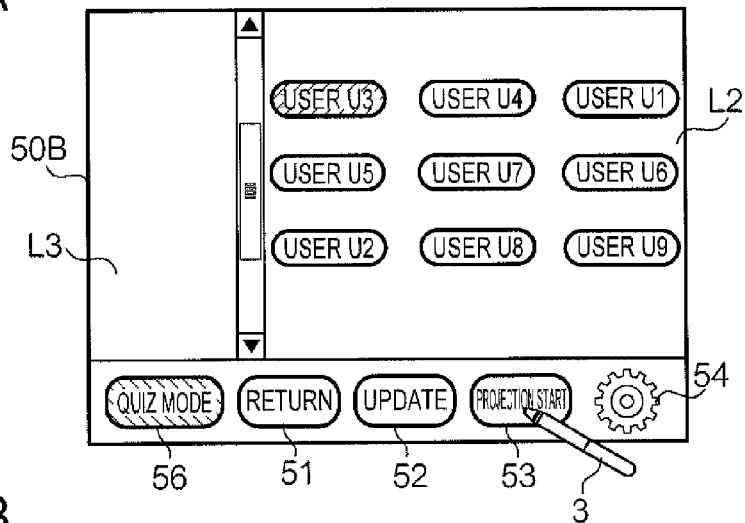
FIGS. 18A to 18C are diagrams illustrating another utilization example of the image for selection.
Figure 18B:
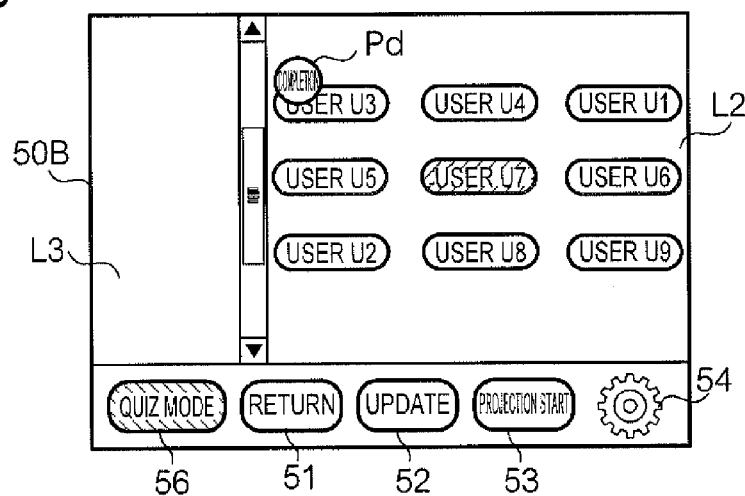
Figure 18C:
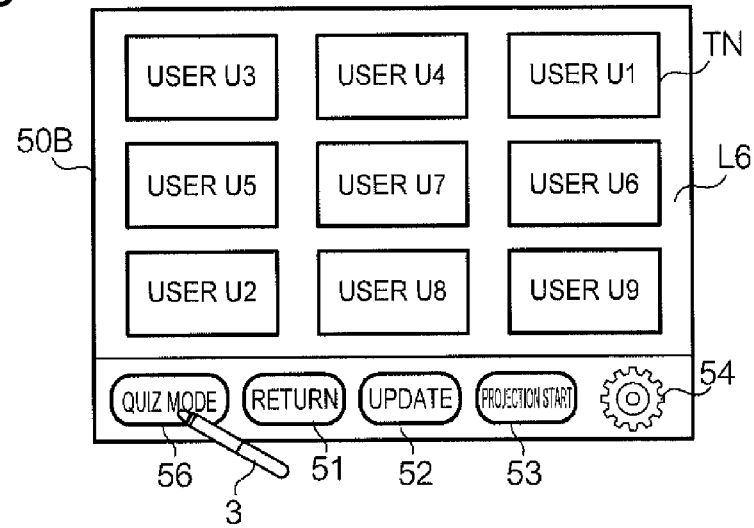

FIGS. 18A to 18C are diagrams illustrating another utilization example of the image for selection SOB. Similar to FIG. 17, FIGS. 18A to 18C illustrate an example when the projection system PS is used in the classroom of the school. In FIGS. 18A to 18C, a quiz mode is executed by the projector 1 and each of the tablet terminals 2. The quiz mode is a function of projecting a thumbnail of an image displayed on the touch panel 24 of each of the tablet terminals 2 onto the screen SC. The quiz mode, for example, is started by the projector 1 when a quiz mode button 56 included in the image for selection 50B is tapped, and is ended when the quiz mode button 56 is tapped again. In this example, when the quiz mode button 56 is tapped again, the thumbnail of each of the tablet terminals 2 is projected before the quiz mode is ended. The teacher taps the user name and the projection start button 53 on the image for selection 50B in a state where the quiz mode is executed, and thus projects the input image onto the projector 1. In FIG. 18A, the teacher selects the user U3 in the state where the quiz mode is executed.

In the quiz mode, the projector 1 displays the user name of the user U onto which the input image from the tablet terminal 2 to be used by the user is projected in distinction from other user names. Specifically, the MCU 10 stores a terminal number (hereinafter, referred to as a "projected terminal number") of the tablet terminal 2 of which the image is projected onto the screen SC in the RAM 12 in distinction from other terminal numbers. The MCU 10 specifies the user name of the user U onto which the input image from the tablet terminal 2 to be used by the user is projected on the basis of the correspondence relationship between the user name and the terminal number, and the selected terminal number stored in the RAM 12. In FIG. 18B, the input image from the tablet terminal 2T3 is projected in advance, and a mark Pd (hereinafter, referred to as a "projection completion mark") indicating that the input image is projected is displayed on the user U3. The teacher selects the next picture source (that is, the tablet terminal 2 in which the input image is not projected yet) from the plurality of tablet terminals 2 with reference to the projection completion mark Pd. In FIG. 18B, the teacher selects the user U7 after selecting the user U3. Furthermore, when the user name on which the projection completion mark Pd is displayed is tapped again, the projector 1 may not project the input image from the tablet terminal 2 corresponding to the user name again.

FIG. 18C illustrates a thumbnail TN projected onto the screen SC. In FIG. 18C, the thumbnail TN of the tablet terminal 2 which is used by the user U1 to the user U9 is displayed on a thumbnail display region L6. The thumbnail display region L6 is displayed by being switched into the seating chart display region L2 and the non-registrant display region L3 when the quiz mode button 56 is tapped again. In FIG. 18C, the thumbnail TN of each of the tablet terminals 2 is illustrated by being simplified in the user name. In FIG. 18C, each thumbnail TN is arranged to be associated with the seating chart of the user U1 to the user U9. When the quiz mode button 56 is tapped again in a state where the quiz mode is started, the projector 1 transmits a request (hereinafter, referred to as a "thumbnail output request") for starting an output of the thumbnail to each of the tablet terminals 2. When the thumbnail output request is received, each of the tablet terminals 2 transmits data indicating the thumbnail to the projector 1. Each of the tablet terminals 2 resizes the image according to the picture signal, and thus the data indicating the thumbnail is created. When the data indicating the thumbnail is received, the projector 1 displays the thumbnail according to the data on the thumbnail display region L6 in a row. The teacher observes the thumbnail TN, and thus is able to confirm all of the answers of the students at once. When the image for selection 50B is tapped in a state where the thumbnail TN is displayed, the image for selection 50B returns to a state before the quiz mode is started.

Furthermore, a timing when the thumbnail TN is displayed is not limited to a timing when the quiz mode button 56 is tapped again. For example, the thumbnail TN may be displayed when the input image from the tablet terminal for the determined number of people is projected. In another example, the thumbnail TN may be displayed when an input image illustrating a correct answer is projected.

Figure 19:
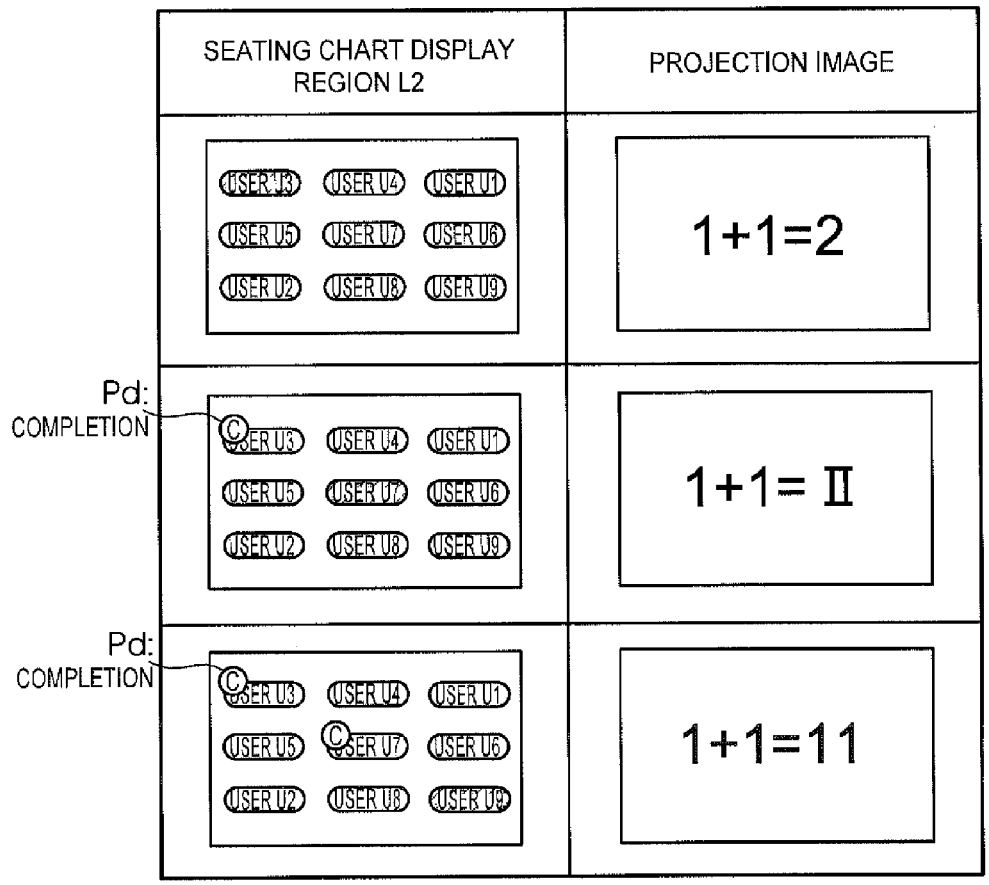
FIG. 19 is a diagram comparing manipulation of a seating chart display region with the configuration of the projection image.

FIG. 19 is a diagram comparing the manipulation of the seating chart display region L2 with the configuration of the projection image when the quiz mode is executed. In a first line of FIG. 19, the user U3 is selected in the seating chart display region L2. In this state, when the projection start button 53 is tapped, the input image from the tablet terminal 2T3 is projected. In this example, the user U3 displays an answer of "2" with respect to a question of "1+1". When the teacher taps the icon SL (not illustrated) on the tool pallet TP in a state where the input image from the tablet terminal 2T3 is projected, the image for selection 50B including the seating chart display region L2 (a second line) is displayed again.

In the second line, the projection completion mark Pd is displayed on the user U3. In addition, in the second line, the user U7 is selected in the seating chart display region L2. In this state, when the projection start button 53 is tapped, the input image from the tablet terminal 2T7 is projected. In this example, the user U7 displays an answer of "II" with respect to the question of "1+1". When the teacher taps the icon SL (not illustrated) on the tool pallet TP in a state where the input image from the tablet terminal 2T7 is projected, the image for selection 50B including the seating chart display region L2 (a third line) is displayed again.

In the third line, the projection completion mark Pd is displayed on the user U3 and the user U7. In addition, in the third line, the user U9 is selected in the seating chart display region L2. In this state, when the projection start button 53 is tapped, the input image from the tablet terminal 2T9 is projected. In this example, the user U9 displays an answer of "11" with respect to the question of "1+1". Hereinafter, by repeating the same manipulation, the teacher sequentially displays the answers of the students on the screen SC.

Figure 20:
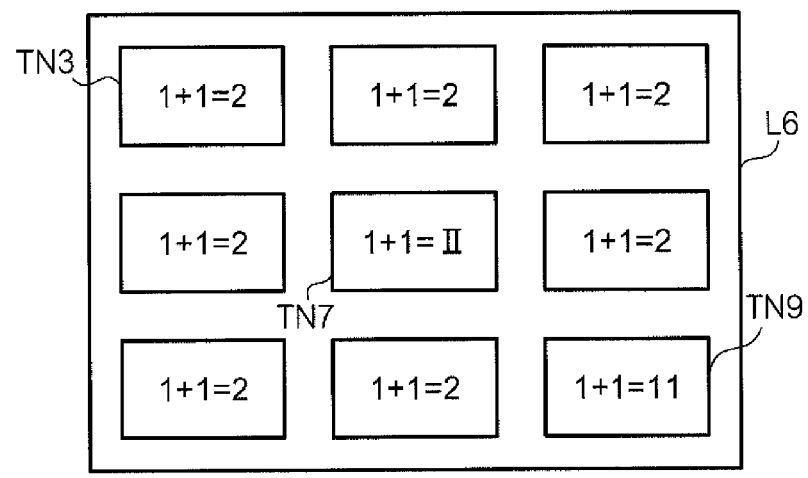
FIG. 20 is a diagram illustrating an example of a thumbnail.

FIG. 20 is a diagram illustrating an example of the thumbnail TN displayed on the thumbnail display region L6. FIG. 20 illustrates the thumbnail TN which is displayed after the manipulation illustrated in FIG. 19 is performed. In FIG. 20, a thumbnail TN3 corresponds to an image displayed on the touch panel 24 of the tablet terminal 2T3. A thumbnail TN7 corresponds to an image displayed on the touch panel 24 of the tablet terminal 2T7. A thumbnail TN9 corresponds to an image displayed on the touch panel 24 of the tablet terminal 2T9.

MODIFICATION EXAMPLE

The invention is not limited to the embodiments described above, and is able to be variously modified. Hereinafter, some Modification Examples will be described. Hereinafter, among Modification Examples to be described, two or more Modification Examples may be combined.

(1) Modification Example 1

The image for selection 50 is not limited to the image for selection 50A and the image for selection 50B described in the embodiment.

Figure 21:
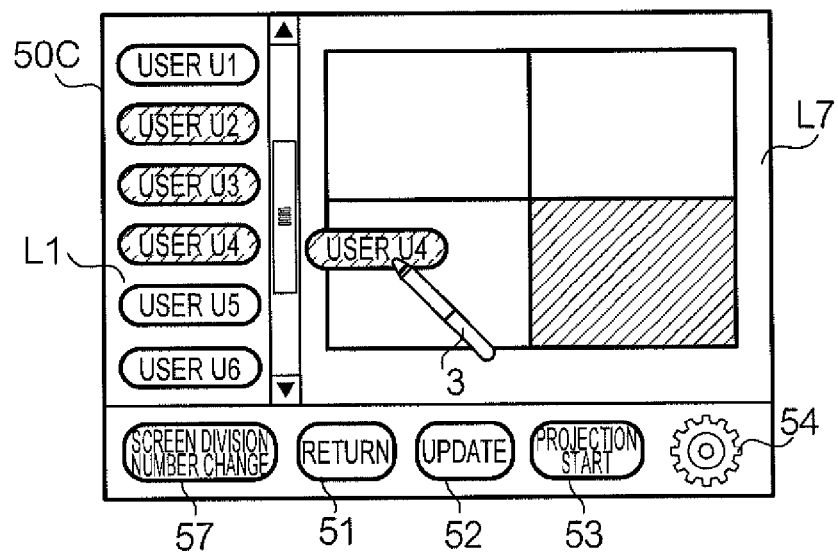
FIG. 21 is a diagram illustrating an image for selection according to Modification Example 1.

FIG. 21 is a diagram illustrating an image for selection 50C according to Modification Example 1. The image for selection 50C includes a screen division number change button 57 and a layout region L7 in addition to the configuration of the image for selection 50A (FIG. 9). The screen division number change button 57 is a button for changing the number of input images projected onto the screen SC. Whenever the screen division number change button 57 is tapped, the number of input images projected onto the screen SC is changed to "1→2→3→4→1→ . . . ". The layout region L7 is a region illustrating an arrangement when the input image is projected. The layout region L7 is divided into a number according to the manipulation of the screen division number change button 57. In FIG. 21, the number of input images projected onto the screen SC is set to 3, and the layout region L7 is divided into 4. Furthermore, in the layout region L7 illustrated in FIG. 21, a lower-right region of which a background is displayed by a hatched line is not used. In the image for selection 50C, an adjustment of the selection of the user and the arrangement of the input image is performed by dragging the user name displayed on the list display region L1, and by dropping the user name onto the layout region L7. In FIG. 21, the user U3 is dropped onto an upper-left region of the layout region L7, and the user U2 is dropped onto an upper-right region. In addition, in FIG. 21, the user UT drags the user U4, and drops the user U4 onto a lower-left region of the layout region L7. In a case where the image for selection 50C is used, when the projection start button 53 is tapped, the MCU 10 stores the arrangement of the user name of the layout region L7 in the RAM 12. When the picture signal is input from the plurality of tablet terminals 2, the MCU 10 projects the plurality of input images onto the screen SC in a row according to the arrangement of the user name stored in the RAM 12.

In another example, the image for selection 50B may not include the non-registrant display region L3.

(2) Modification Example 2

The manipulation of registering the seating chart data in the projector 1 may be performed in a state where the projector 1 and the tablet terminal 2 are not necessarily connected. For example, the user name of each of the users U is managed in the PC 4, and the PC 4 transmits the user name to the projector 1, and thus an environment where the projector 1 and each of the tablet terminals 2 are virtually connected may be established. In this case, when the respective tablet terminals 2 are connected in a wireless manner, the projector 1 may transmit the seating chart data and the seating chart ID to each of the tablet terminals 2.

(3) Modification Example 3

The user name which is not included in the seating chart data stored in the storage unit 13 may not be displayed on the list display region L1. In this case, the projector 1 determines whether or not the user name is included in the seating chart data when the user name and the terminal number from the tablet terminal 2 are acquired. When the user name acquired from the tablet terminal 2 is not included in the seating chart data, the projector 1 restricts the user name and the terminal number from being newly stored in the RAM 12. Furthermore, when the manipulation for registering the seating chart data is performed, the restriction is not performed.

(4) Modification Example 4

The seating chart preparation image is not limited to the image described in the embodiment. For example, a square may be displayed on the grid region L5 instead of the grid line. In this case, the arrangement of user name may be determined by dropping the user name onto the square by using indicator 3 by the user UT.

(5) Modification Example 5

The terminal number is not limited to a MAC address. The terminal number, for example, may use an IP address.

(6) Modification Example 6

The projector 1 may not manage the terminal number of the tablet terminal 2. In this case, each of the plurality of tablet terminals 2 is identified by the user name acquired from the tablet terminal 2. Furthermore, when the plurality of users of the same user name uses the tablet terminal 2, each of the plurality of tablet terminals 2 may be identified by the user name and the terminal number.

(7) Modification Example 7

The manipulation of the image for selection 50 and the seating chart preparation image 70 is not limited to the manipulation described above. For example, in the seating chart preparation image 70, the user name displayed on the candidate display region L4 and a point in the grid region L5 may be tapped instead of the drag and drop.

(8) Modification Example 8

The state of the user U displayed on the image for selection 50 is not limited to whether or not the user U logs into the tablet terminal 2, whether or not the user U performs the input corresponding to the showing hand with respect to the tablet terminal 2, and whether or not the user U projects the input image from the tablet terminal 2 to be used by the user. For example, when the projection system PS is used in the classroom of the school, whether or not the answer of the student with respect to the question is ended may be displayed on the image for selection 50. In another example, a state where the user U leaves the seat may be displayed on the image for selection 50. In another example, a state where the user U ends the application and program, or a state where the user U logs out of the tablet terminal 2 may be displayed on the image for selection 50.

(9) Modification Example 9

The selection of the picture source may be performed by manipulating the PC 4 or the controller R in addition to the method described in the embodiment. When the selection of the picture source uses the PC 4, the image corresponding to the image for selection 50 is displayed on the PC 4.

(10) Modification Example 10

The tablet terminal 2 which outputs the picture signal to the projector 1 is not limited to the tablet terminal 2 which receives the output request from the projector 1. Each of the tablet terminals 2 may output the picture signal to the projector 1. In this case, the processing of Step SA7 is omitted, and the MCU 10 projects the input image from the tablet terminal 2 specified by the selected terminal number onto the screen SC in Step SA8. In addition, in this case, when the quiz mode is executed, the projector 1 may create the data indicating the thumbnail according to the input image from each of the tablet terminals 2.

(11) Modification Example 11

The electronic apparatus which outputs the picture signal to the projector 1 is not limited to the tablet terminal 2. For example, in the projection system PS, a personal computer may be used instead of the tablet terminal 2.

(12) Modification Example 12

The processing performed by the projector 1 is not limited to the processing illustrated in FIG. 7 and FIG. 12. For example, the seating chart name input image 80 may be displayed before the seating chart preparation image 70 is displayed. In this case, in FIG. 12, the processings in Step SB6 and Step SB7 are performed before the processings in Step SB4 and Step SB5 are performed, and when the enter key 83 is tapped, the seating chart preparation image 70 is displayed.

(13) Modification Example 13

The hardware configuration of the various devices used in the projection system PS is not limited to the configuration illustrated in FIG. 3 to FIG. 6. When the processings illustrated in FIG. 7 and FIG. 12 are executed, the various devices may have any hardware configuration. For example, the liquid crystal panel 162 may be a reflective liquid crystal panel. In addition, an electrooptic element such as an organic Electro Luminescence (EL) element, and a digital mirror device (DMD) may be used instead of the liquid crystal panel 162. In addition, the liquid crystal panel 162 may not be disposed for each color component, and the projector 1 may include a single liquid crystal panel 162. In this case, the image of each color component may be displayed in a time division manner. In another example, the projector 1 may have a function of the access point P. Further, in another example, when the indicator 3 is a manipulation device which is able to input the indication into the projector 1 on the projection surface, the indicator 3 may be a laser pointer, a remote controller, and the like. Further, the indicator 3 may not be necessarily the manipulation device, and for example, may be a part of a body of the user (a finger or the like). In addition, a direct view-type display device such as a liquid crystal display (LCD), an organic EL display, and a plasma display may be used instead of the projector. In this case, a touch panel may be adopted as the manipulation device which is able to input the indication on the display screen.

(14) Modification Example 14

The configuration of the projection system PS is not limited to the configuration illustrated in FIG. 1. For example, each of the tablet terminals 2 may be connected to the PC 4. In this case, the user name and the terminal number are transmitted to the PC 4 from the tablet terminal 2, and are transmitted to the projector 1 from the PC 4. In addition, in this case, the projector 1 transmits the output request to which the selected terminal number is added to the PC 4, and the PC 4 transmits the output request to the tablet terminal 2 specified by the selected terminal number in Step SA7. When the output request is received from the PC 4, the tablet terminal 2 outputs the picture signal to the PC 4. The PC 4 outputs the picture signal input from the tablet terminal 2 to the projector 1. In another example, the projector 1 and the tablet terminal 2 may be connected by an image signal cable, a USB cable, or the like in a wired manner.

What is claimed is:

1. A projector, comprising:
an optical modulation section configured to modulate incident light;
a projection section configured to project light which is modulated by the optical modulation section onto a projection surface;
a driving section configured to drive the optical modulation section according to a projection image;
a selection section configured to select at least one electronic apparatus from a plurality of electronic apparatuses;
a storage section configured to store a user identifier identifying each user of the plurality of electronic apparatuses;
a reception section configured to receive an input on the projection surface; and
a projection image creation section configured to create the projection image on the basis of a picture signal from an electronic apparatus which is selected by the selection section,
wherein the projection image creation section includes
a first reflection section configured to reflect an image drawn on the basis of the input received by the reception section onto the projection image, and
a second reflection section configured to create a selection image which is an image for selecting at least one user from the respective users of the plurality of electronic apparatuses and includes the user identifier stored in the storage section, and reflecting the selection image onto the projection image, when an input for selecting the user is received by the reception section, the selection section sets an electronic apparatus corresponding to the selected user to a selected electronic apparatus on the projection surface onto which the projection image reflecting the selection image is projected, and the storage section stores data indicating a spatial positional relationship of the respective users of the plurality of electronic apparatuses, and the second reflection section creates the selection image in which the user identifier is arranged according to the positional relationship indicated by the data, and reflects the selection image onto the projection image, the selection image including a first display region in which the user identifiers are displayed arranged according to the positional relationship and a second display region in which one or more user identifiers not included in the positional relationship are displayed.

2. The projector according to claim 1, wherein the selection section determines the number of electronic apparatuses to be selected according to the number of users selected on the projection surface onto which the projection image reflecting the selection image is projected.

3. The projector according to claim 1, wherein the selection image indicates a state of a user identified by the user identifier.

4. The projector according to claim 3, wherein the state of the user is whether or not the user logs into an electronic apparatus which is used by the user.

5. The projector according to claim 3, wherein the state of the user is whether or not the user performs a predetermined input with respect to the electronic apparatus.

6. The projector according to claim 3, wherein the state of the user is whether or not each of the electronic apparatuses used by the user is selected by the selection section.

7. The projector according to claim 1, further comprising: a restriction section configured to restrict the user identifier from being newly stored in the storage section when a user identifier which is not stored in the storage section is acquired from any electronic apparatus of the plurality of electronic apparatuses.

8. The projector according to claim 1, wherein when a user identifier displayed in the second display region is not included in the data indicating the spatial positional relationship, the storage section restricts the user identifier from being stored.

9. A display device, comprising:
a display section configured to display a display image on a display screen;
a selection section configured to select at least one electronic apparatus from a plurality of electronic apparatuses;
a storage section configured to store a user identifier identifying each user of the plurality of electronic apparatuses;
a reception section configured to receive an input on the display surface; and
a display image creation section configured to create the display image on the basis of a picture signal from an electronic apparatus which is selected by the selection section,
wherein the display image creation section includes
a first reflection section configured to reflect an image drawn on the basis of the input received by the reception section onto the display image, and
a second reflection section configured to create a selection image which is an image for selecting at least one user from the respective users of the plurality of electronic apparatuses and includes the user identifier stored in the storage section, and reflecting the selection image onto the display image, when an input for selecting the user is received by the reception section, the selection section sets an electronic apparatus corresponding to the selected user to a selected electronic apparatus on the display screen on which the display image reflecting the selection image is displayed, and the storage section stores data indicating a spatial positional relationship of the respective users of the plurality of electronic apparatuses, and the second reflection section creates the selection image in which the user identifier is arranged according to the positional relationship indicated by the data, and reflects the selection image onto the display image, the selection image including a first display region in which the user identifiers are displayed arranged according to the positional relationship and a second display region in which one or more user identifiers not included in the positional relationship are displayed.

10. The display device according to claim 9, wherein when a user identifier displayed in the second display region is not included in the data indicating the spatial positional relationship, the storage section restricts the user identifier from being stored.

11. A display system, comprising:
a plurality of electronic apparatuses; and
a display device,
wherein the plurality of electronic apparatuses includes an output section configured to output a picture signal to the display device,
the display device includes
a display section configured to display a display image on a display screen,
a selection section configured to select at least one electronic apparatus from the plurality of electronic apparatuses,
a storage section configured to store a user identifier identifying each user of the plurality of electronic apparatuses,
a reception section configured to receive an input on the display surface, and
a display image creation section configured to create the display image on the basis of a picture signal output from an electronic apparatus selected by the selection section,
the display image creation section includes
a first reflection section configured to reflect an image drawn on the basis of the input received by the reception section onto the display image, and
a second reflection section configured to create a selection image which is an image for selecting at least one user from the respective users of the plurality of electronic apparatuses and includes the user identifier stored in the storage section, and reflecting the selection image onto the display image, when an input for selecting the user is received by the reception section, the selection section sets an electronic apparatus corresponding to the selected user to a selected electronic apparatus on the display screen on which the display image reflecting the selection image is displayed, and the storage section stores data indicating a spatial positional relationship of the respective users of the plurality of electronic apparatuses, and the second reflection section creates the selection image in which the user identifier is arranged according to the positional relationship indicated by the data, and reflects the selection image onto the display image, the selection image including a first display region in which the user identifiers are displayed arranged according to the positional relationship and a second display region in which one or more user identifiers not included in the positional relationship are displayed.

12. The display system according to claim 11, wherein when a user identifier displayed in the second display region is not included in the data indicating the spatial positional relationship, the storage section restricts the user identifier from being stored.

13. A control method of a display device which includes a display section displaying a display image according to a picture signal received from an electronic apparatus on a display screen, a reception section receiving an input on the display screen, and a storage section storing data, comprising:

(A) storing a user identifier identifying each user of a plurality of electronic apparatuses in the storage section;

(B) selecting at least one electronic apparatus from the plurality of electronic apparatuses;

(C) reflecting an image drawn on the basis of the input received by the reception section onto the display image;

(D) creating a selection image which is an image for selecting at least one user from the respective users of the plurality of electronic apparatuses and includes the user identifier stored in the storage section, and reflecting the selection image onto the display image; and (E) setting an electronic apparatus corresponding to a user selected by the input which is received by the reception section to a selected electronic apparatus in a state in which a display image reflecting the selection image created in (D) is displayed, wherein data indicating a spatial positional relationship of the respective users of the plurality of electronic apparatuses is stored in the storage section, and the selection image is created in which the user identifier is arranged according to the positional relationship indicated by the data, and the selection image is reflected onto the display image, the selection image including a first display region in which the user identifiers are displayed arranged according to the positional relationship and a second display region in which one or more user identifiers not included in the positional relationship are displayed.

14. The control method according to claim 13, wherein when a user identifier displayed in the second display region is not included in the data indicating the spatial positional relationship, the storage section restricts the user identifier from being stored.

* * * * *